United States Patent
Nishijima

(10) Patent No.: US 9,257,909 B2
(45) Date of Patent: Feb. 9, 2016

(54) SWITCHING POWER SUPPLY WITH SWITCHING FREQUENCY CONTROLLED TO PREVENT HARMONIC INTERFERENCE WITH RECEIVED RADIO BROADCAST

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 277 days.

(21) Appl. No.: 14/041,926

(22) Filed: Sep. 30, 2013

(65) Prior Publication Data

US 2014/0119062 A1    May 1, 2014

(30) Foreign Application Priority Data

Oct. 25, 2012 (JP) ................................ 2012-236091

(51) Int. Cl.
*H02M 3/335* (2006.01)
*H02M 1/44* (2007.01)

(52) U.S. Cl.
CPC ............... *H02M 3/335* (2013.01); *H02M 1/44* (2013.01)

(58) Field of Classification Search
CPC ....................................................... H02M 1/44
See application file for complete search history.

(56) References Cited

U.S. PATENT DOCUMENTS

| 5,537,305 A * | 7/1996 | Colotti ............................ 363/39 |
| 2005/0064842 A1 * | 3/2005 | Patel ............................. 455/345 |
| 2006/0221654 A1 * | 10/2006 | Kawasaki et al. ............... 363/39 |
| 2007/0049202 A1 * | 3/2007 | Kokuzawa ................... 455/63.3 |
| 2008/0166979 A1 * | 7/2008 | Brandon ......................... 455/77 |
| 2014/0055117 A1 * | 2/2014 | Elwan ..................... H02M 1/44 323/311 |

FOREIGN PATENT DOCUMENTS

| JP | 2003-153526 A | 5/2003 |
| JP | 2005-130081 A | 5/2005 |
| JP | 2006-217375 A | 8/2006 |
| JP | 4618386 B1 | 1/2011 |

* cited by examiner

*Primary Examiner* — Harry Behm
(74) *Attorney, Agent, or Firm* — Rabin & Berdo, P.C.

(57) ABSTRACT

A switching power supply determines the order n (a natural number) of the power supply higher harmonic component near the receiving frequency fc of an AM radio broadcast, and judges whether the higher harmonic component of the order n is higher or lower than the receiving frequency fc of the AM radio broadcast. According to the judgment result, the switching power supply determines an upper limit value and a lower limit value for the power supply frequency fs that does not interfere with the receiving frequency fc of the AM radio broadcast from the values of the fundamental power supply frequency fso of the switching operation, the order n of the higher harmonic component, the receiving frequency fc of the AM radio broadcast, and the bandwidth BW of the receiving frequency. The power supply frequency fs is set within the range specified by the upper and lower limit values.

7 Claims, 5 Drawing Sheets

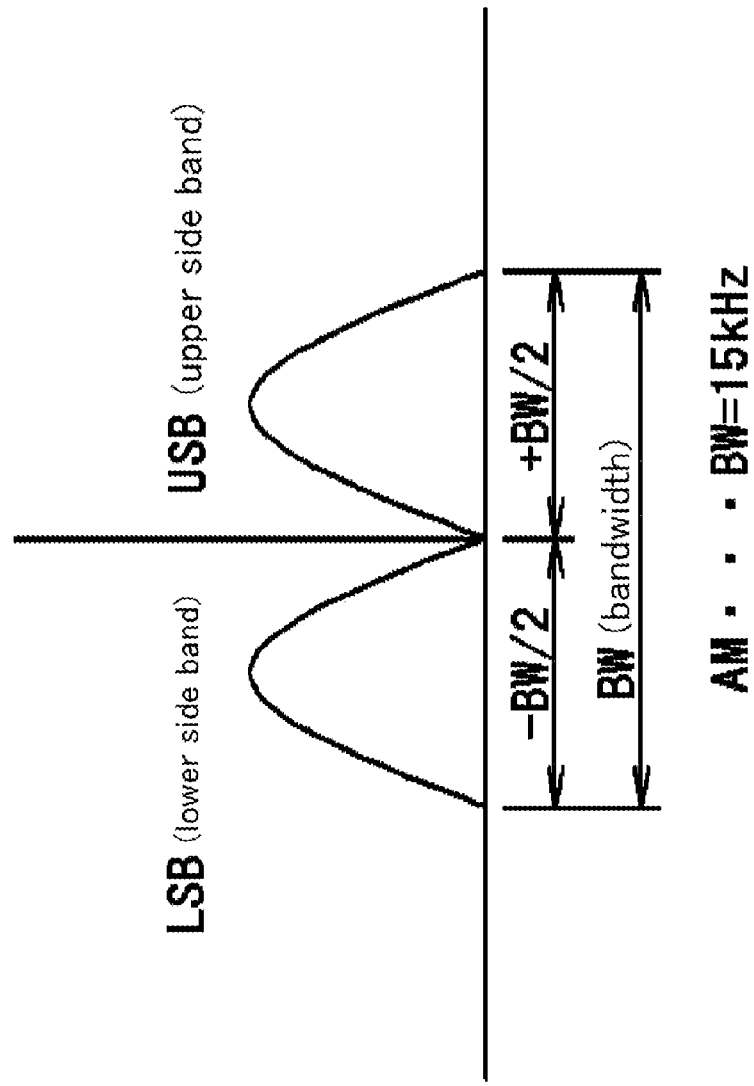

SWITCHING POWER SUPPLY WITH SWITCHING FREQUENCY CONTROLLED TO PREVENT HARMONIC INTERFERENCE WITH RECEIVED RADIO BROADCAST

CROSS-REFERENCE TO RELATED APPLICATION

This application is based on, and claims priority to, Japanese Patent Application No. 2012-236091, filed on Oct. 25, 2012, contents of which are incorporated herein by reference.

BACKGROUND OF THE INVENTION

1. Field of the Invention

The present invention relates to a switching power supply that prevents AM radio broadcast from receiving disturbance due to power supply noises, and reduces the power supply noises.

2. Description of the Related Art

A switching power supply inevitably generates high frequency power supply noises, electromagnetic interference (EMI) noises, due to switching operation of a semiconductor switching element as shown in FIG. 4. The power supply noise causes AM radio broadcast disturbance when the frequency of the power supply noise overlaps the AM radio frequency band. In order to reduce the power supply noise, i.e. an electromagnetic radiation noise due to the switching operation in a switching power supply, Patent Document 1 (identified further on) discloses modifying the power supply frequency, i.e. switching frequency, with random fluctuation i.e. jitter.

Patent Document 2 (identified further on) discloses a method to avoid the radio receiving disturbance, in which the power supply frequency, i.e., the switching frequency of a switching power supply is detected from the output voltage of the power supply, and if the difference is small between the higher harmonic of the detected switching frequency and the receiving frequency by the AM radio receiver, the switching frequency of the power supply is changed. A frequency band of AM radio broadcast includes, as shown in FIG. 5, a bandwidth BW of upper and lower side bands around the central carrier frequency fc, which is a so-called receiving frequency. Thus, radio receiving disturbance can be avoided if the difference mentioned above is greater than the side band width BW/2.

[Patent Document 1]
Japanese Unexamined Patent Application Publication No. 2003-153526 [Patent Document 2]
Japanese Unexamined Patent Application Publication No. 2005-130081

However, even if the power supply noise is reduced by using a jitter control technique to the switching frequency as disclosed in Patent Document 1, the disturbance to receiving AM radio broadcast is not necessarily avoided with the reduced power supply noise. The jitter control of the switching frequency causes the power spectrum of the power supply noise to not be concentrated at a specific frequency but diffused over a frequency axis. As a result, it becomes more likely for the frequency of the power supply noise to overlap or interfere with the frequency band of the AM radio broadcast, thus causing disturbance to receiving the AM radio broadcast.

The method disclosed in Patent Document 2 compares a predetermined reference value with the difference between the receiving frequency fc of an AM radio broadcast and the higher harmonic frequency of the order n (n is a natural number) of the switching frequency of the switching power supply. According to the comparison result, the oscillation frequency, i.e. the switching frequency, of the switching power supply is simply shifted stepwise.

Consequently, if the oscillation frequency, i.e. switching frequency, of the switching power supply contains itself an error due to scattering of characteristics of circuit components of the switching power supply, the shift control of the oscillation frequency of the switching power supply according to solely the difference would divert the oscillation frequency, i.e., the switching frequency or the power supply frequency, of the switching power supply significantly from the frequency of the specification of the power supply. This may create a problem that the filter provided in the switching power supply cannot remove enough conduction noise emitted from the switching power supply through a power supply line.

SUMMARY OF THE INVENTION

The present invention has been made in view of this situation and an object of the present invention is to provide a switching power supply that prevents interference between the receiving frequency band of AM radio broadcast and the frequency of power supply noises and avoids receiving disturbance on the AM radio broadcast. Power supply noises are also reduced in the switching power supply.

In order to achieve the above object, a switching power supply of the present invention comprises a main body of the switching power supply that performs switching operation of a DC power using a semiconductor switching element ON/OFF-driven at a power supply frequency fs and rectifying and smoothing operation of the switched power to supply a DC voltage to electronic devices including an AM radio receiver, and a receiving frequency detecting means that detects a receiving frequency fc of an AM radio broadcast. The switching power supply further comprises a power supply frequency detecting means that detects power supply frequency fs of ON/OFF-driving the semiconductor switching element, and a higher harmonic detecting means that determines an order n, which is a natural number, of a higher harmonic component near the receiving frequency fc of the AM radio broadcast, the higher harmonic being a power supply higher harmonic generated with switching operation of the semiconductor switching element, based on a fundamental power supply frequency fso of ON/OFF-driving the semiconductor switching element.

The switching power supply further comprises a frequency judging means that judges whether the higher harmonic component of the order n that is determined by the higher harmonic detecting means is higher or lower than the receiving frequency fc of the AM radio broadcast, and a power supply frequency width determining means that determines, according to the frequency judgment result, an upper limit value fs-max and a lower limit value fs-min for a power supply frequency fs that does not interfere with the receiving frequency fc of the AM radio broadcast from the values of the fundamental power supply frequency fso of the switching operation, the order n of the higher harmonic component, the receiving frequency fc of the AM radio broadcast, and the bandwidth BW thereof, and a power supply frequency control means that compares the power supply frequency fs with the upper limit value fs-max and with the lower limit value fs-min for the power supply frequency fs and sets the power supply frequency fs at a value within a range specified by the upper limit value fs-max and the lower limit value fs-min.

The power supply frequency width determining means may determine the upper limit value fs-max and the lower limit value fs-min for a power supply frequency fs so that relations fso×n>fc+BW/2 and fso×(n−1)<fc−BW/2 are satisfied when the higher harmonic component (fso×n) of the order n is higher than the receiving frequency fc of the AM radio broadcast, and so that relations fso×(n+1)>fc+BW/2 and fso×n<fc−BW/2 are satisfied when the higher harmonic component (fso×n) of the order n is lower than the receiving frequency fc of the AM radio broadcast.

The power supply frequency control means may maintain the power supply frequency fs when the power supply frequency fs is in the range specified by the upper limit value fs-max and the lower limit value fs-min, and correct the power supply frequency fs so as to be contained in the range specified by the upper limit value fs-max and the lower limit value fs-min when the power supply frequency fs is outside the range.

In particular, the power supply frequency control means may determine the power supply frequency fs within the range specified by the upper limit value fs-max and the lower limit value fs-min and, for example necessarily, in a frequency range determined based on a specification of the switching power supply.

In a switching power supply according to an embodiment of the invention, the upper limit value fs-max and the lower limit value fs-min for a power supply frequency fs are obtained in which the higher harmonic component of the order n of the fundamental power supply frequency fso does not overlap (or interfere) with the bandwidth of the receiving frequency fc of the AM radio broadcast. This range of power supply frequency fs is determined corresponding to the receiving frequency fc of the AM radio broadcast and the bandwidth BW thereof, and the fundamental power supply frequency fso and the order n of the higher harmonic thereof. Then, the actual power supply frequency fs detected by the power supply frequency detecting means is compared with the frequency range specified by the upper limit value fs-max and the lower limit value fs-min. The power supply frequency fs is set and controlled so as to be included within this frequency range. Therefore, receiving disturbance to an AM radio broadcast is surely avoided in a simple way.

Moreover, since the actual power supply frequency fs is set in the range that is itself regulated corresponding to the receiving frequency fc of the AM radio broadcast, the power supply frequency fs is managed and controlled within the permissible variation range prescribed by the specification of the switching power supply even though the power supply frequency initially has some error due to variation in characteristics of the circuit components of the power supply. As a consequence, undesirable conduction noise, in addition to the electromagnetic radiation noise, is also suppressed reliably without changing the filter performance provided in the switching power supply.

When a vehicle mounting a switching power supply of the invention moves and this movement changes the receiving frequency fc of the AM radio broadcast that can be received, the power supply frequency fs is changed adaptively corresponding to the receiving frequency fc of the AM radio broadcast. Therefore, power supply noise is suppressed effectively corresponding to the position of the vehicle.

BRIEF DESCRIPTION OF THE DRAWINGS

FIG. 5 shows the receiving band of the AM radio broadcast.

DETAILED DESCRIPTION OF THE INVENTION

The following describes an example of switching power supply according to an embodiment of the present invention with reference to accompanying drawings.

Figure 1:
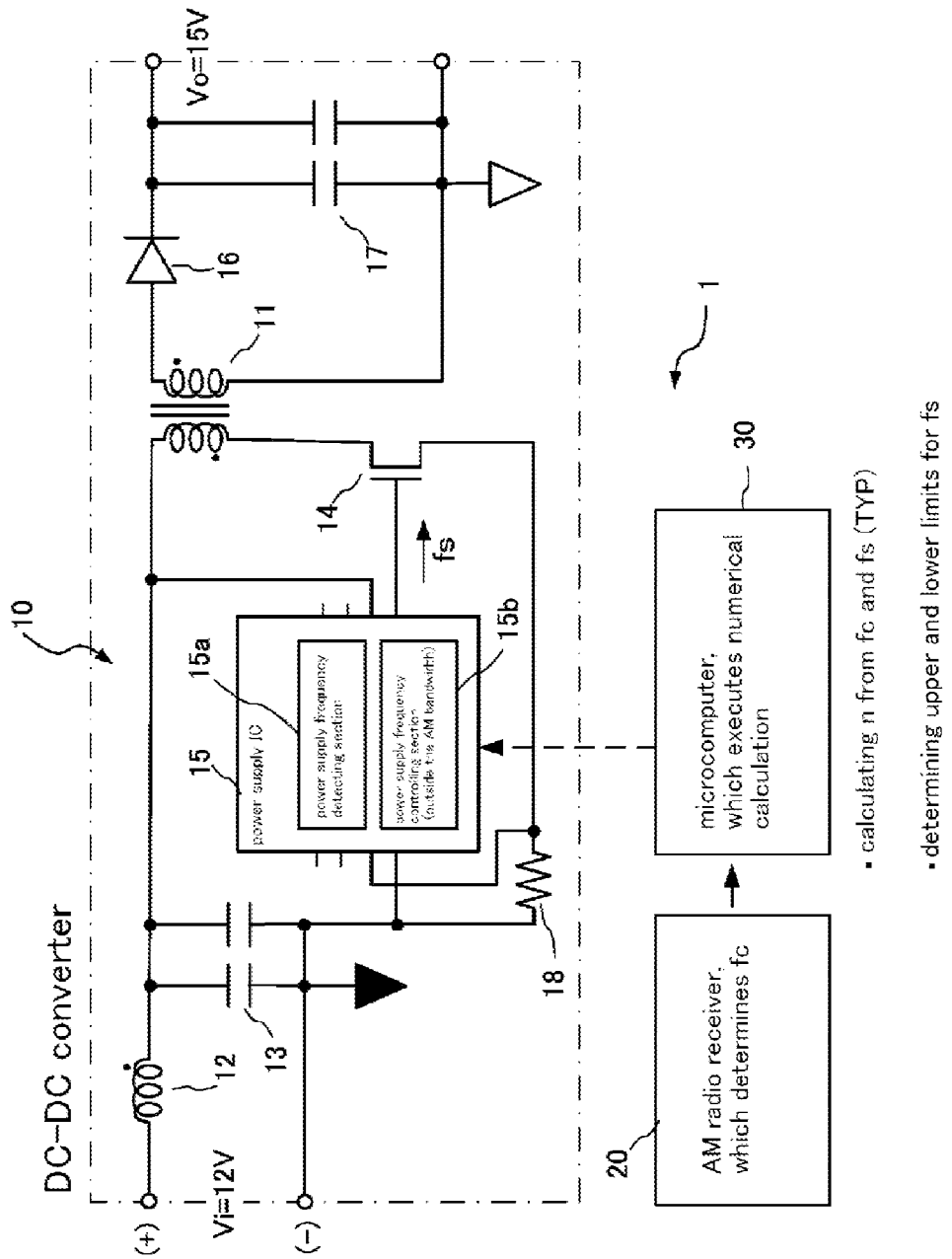
FIG. 1 shows a schematic construction of a switching power supply according to an embodiment of the present invention.

FIG. 1 shows schematically an overall construction of a switching power supply 1 according to an embodiment of the present invention. The main body 10 of the switching power supply is a DC-DC converter. This main body 10 of the switching power supply is used onboard. It conducts switching of a DC power at 12 V supplied by a battery (not shown in the figure) mounted on a vehicle at a specified power supply frequency fs and gives the switched power to an isolation transformer 11. An AC power delivered from the secondary winding of the isolation transformer 11 is rectified and smoothed, and supplied to various types of onboard electronic devices that are mounted on the vehicle as well as the main body 10 of the switching power supply.

More specifically, the DC power at 12 V is taken in through an input filter circuit composed of an inductor 12 and an input capacitor 13 provided on the input stage of the main body 10 of the switching power supply. The DC power is then given through the primary winding of the isolation transformer 11, to a semiconductor switching element 14 (hereinafter also referred to simply as a switching element) and switched thereby. The switching element 14 can be an IGBT. It is ON/OFF driven under control of a power supply IC 15, which is a switching control circuit, at the power supply frequency fs. The switching operation of the switching element 14 converts the DC power to an AC power through the isolation transformer 11.

The AC power taken out from the secondary winding of the isolation transformer 11 at a boosted voltage is rectified and smoothed through an output filter circuit composed of a rectifying diode 16 and an output capacitor 17. The obtained DC voltage at 15 V, for example, is supplied to an AM radio receiver 20, for example, mounted on the vehicle. The DC-DC converter described in the following is of a flyback type using an isolation transformer 11. However, the present invention can be applied to any circuit types of DC-DC converters of conventional technologies except for a self-commutated DC-DC converter.

The power supply IC 15 of the main body 10 of the switching power supply comprises an oscillator that generates a pulse signal of a fundamental power supply frequency fso at 100 kHz to ON/OFF-drive the switching element 14. This oscillator can be of a voltage controlled type, which varies the oscillation frequency corresponding to a control voltage.

The power supply IC 15 has a power supply frequency detecting section (i.e. a power supply frequency detecting means) 15*a* that detects the power supply frequency fs in ON/OFF driving the switching element 14 from the current through the switching element 14 detected with a shunt resistor 18. The power supply IC 15 also has a power supply frequency control section (i.e. a power supply frequency control means) 15*b* that compares the power supply frequency fs detected by the power supply frequency detecting section 15*a* with an upper limit value fs-max and with a lower limit value fs-min for the power supply frequency fs, the limiting values being obtained in a microcomputer 30 as described later. The power supply frequency control section 15b, according to the comparison result, sets the power supply frequency fs within the range A specified by the upper limit value fs-max and the lower limit value fs-min.

The power supply frequency control section 15b basically maintains the power supply frequency fs as it is when the power supply frequency fs falls into the range A specified by the upper limit value fs-max and the lower limit value fs-min. If the power supply frequency fs is outside the range A specified by the upper limit value fs-max and the lower limit value fs-min, the power supply frequency control section 15b resets the power supply frequency fs, changing the fs so as to be contained within the range A.

In addition to the main body 10 of the switching power supply having the construction described above, the switching power supply 1 is provided with a power supply IC control function for controlling the operation of the power supply frequency control section 15b. The power supply IC control function detects the AM radio receiving frequency (e.g. a carrier frequency) fc of the radio broadcast to be received by the AM radio receiver 20, and determines the upper limit value fs-max and the lower limit value fs-min for the power supply frequency fs corresponding to the AM radio receiving frequency fc, the limiting values being used in controlling the operation of the power supply frequency control section 15b. The power supply IC control function is carried out for example by a microcomputer 30 accompanying the main body 10 of the switching power supply. The microcomputer 30 builds in the processing functions as described in the following.

The microcomputer 30 is provided with a receiving frequency detecting means and a higher harmonic detecting means. The receiving frequency detecting means detects the AM radio receiving frequency fc in the AM radio receiver 20. The higher harmonic detecting means determines, based on a fundamental power supply frequency fso of the main body 10 of the switching power supply, an order n (which is a natural number) of the component of the power supply higher harmonic near the AM radio receiving frequency fc, the power supply higher harmonic being generated with the switching operation of the switching element 14. The microcomputer 30 is also provided with a power supply frequency width determining means that judges whether the higher harmonic component of the order n is higher or lower than the AM radio receiving frequency fc, and corresponding to the judgment result, the power supply frequency width determining means determines the upper limit value fs-max and the lower limit value fs-min for the power supply frequency fs that does not interfere with the AM radio receiving frequency fc, based on the values of the fundamental power supply frequency fso of the switching operation, the order n of the higher harmonic component, the AM radio receiving frequency fc, and the bandwidth BW of the radio receiving frequency.

Figure 3:
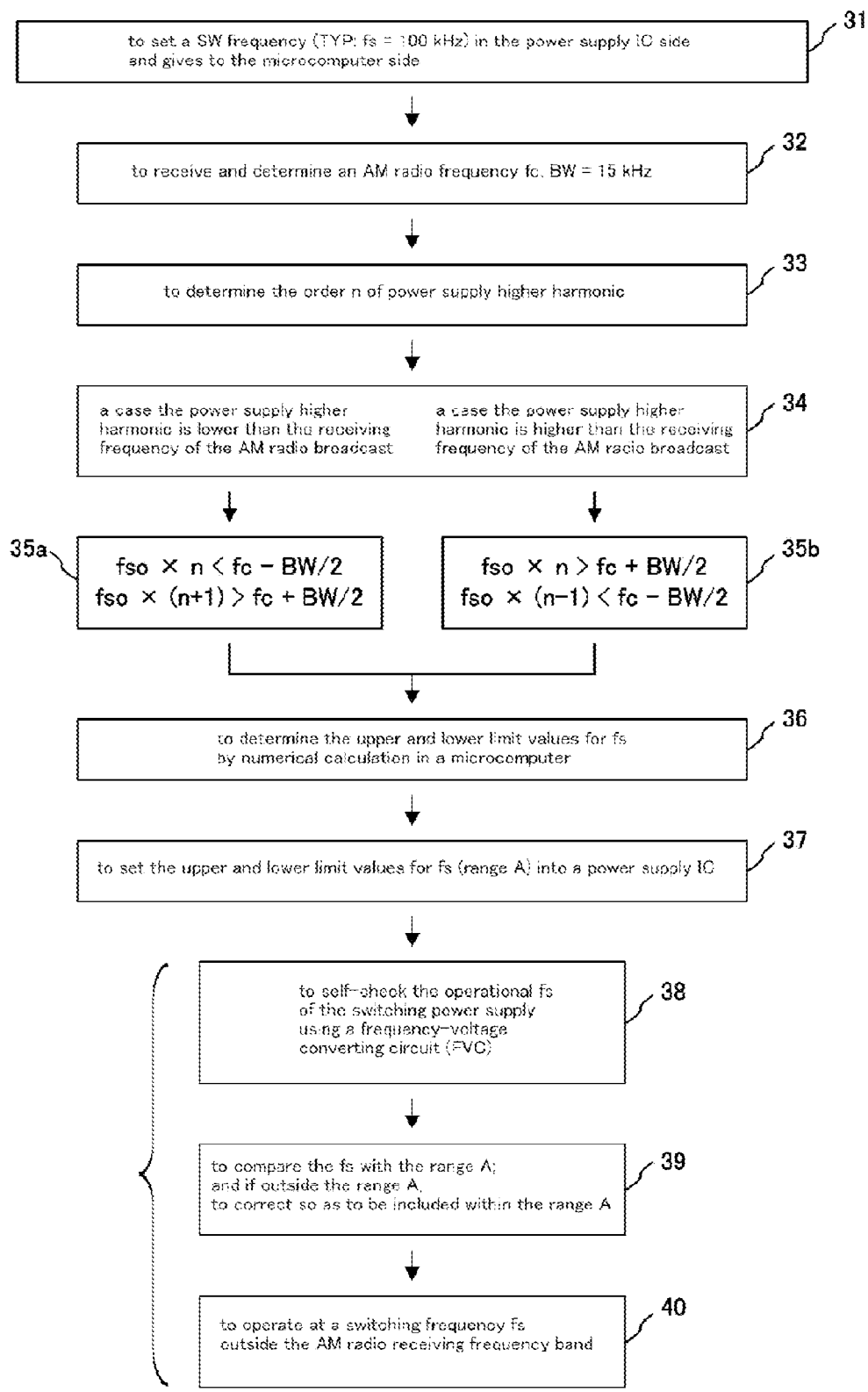
FIG. 3 shows an operating process in a microcomputer and an operating process in a main body of the switching power supply shown in FIG. 1.
Figure 4:
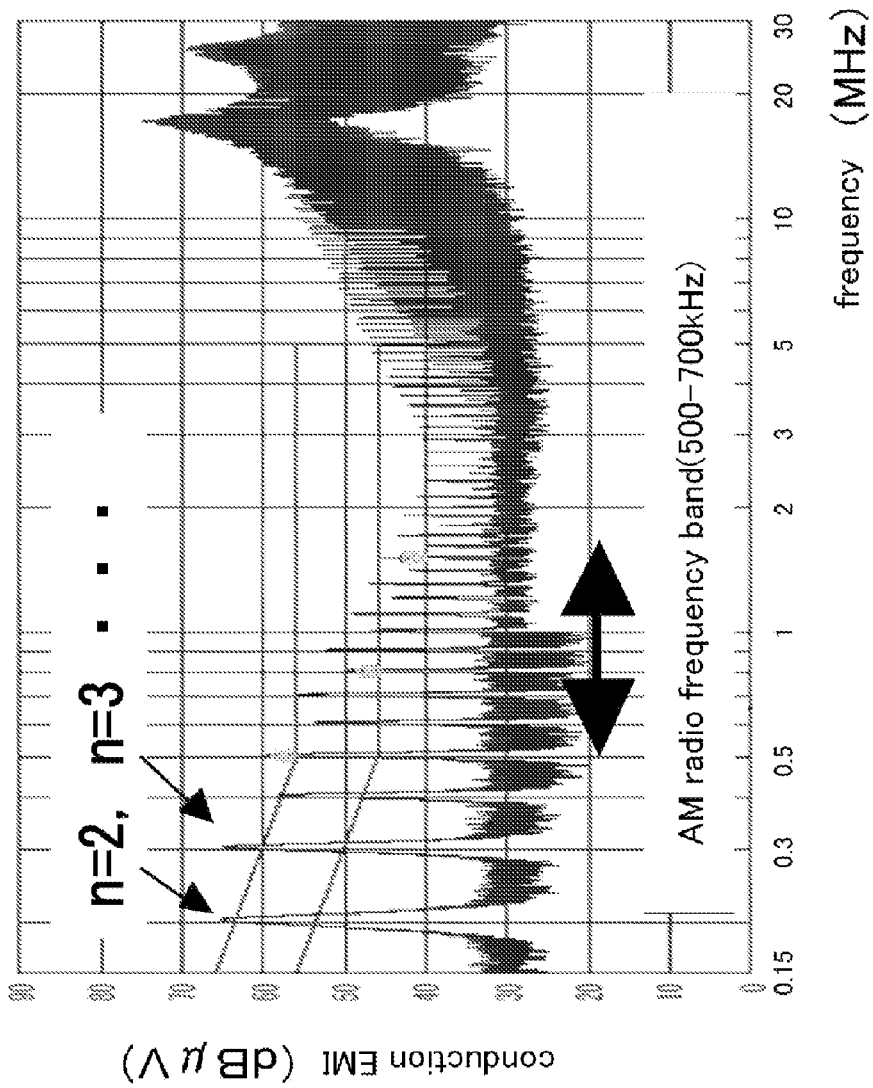
FIG. 4 shows a relationship between electromagnetic interference noises of a switching power supply and the frequency band of an AM radio broadcast.

Precise processing in the microcomputer 30 is shown in the flow chart of FIG. 3. First, a power supply frequency acquiring means 31 acquires the fundamental power supply frequency fso of the switching operation in the main body 10 of the switching power supply based on the specifications of the switching power supply. A receiving frequency detecting means 32 in the microcomputer 30 detects the AM radio receiving frequency fc from the tuning information of the AM radio receiver 20.

After that, the microcomputer 30 determines such a power supply noise frequency component from the main body 10 of the switching power supply that may cause receiving disturbance to the AM radio broadcast at an AM radio receiving frequency fc, based on the fundamental power supply frequency fso and the AM radio receiving frequency fc obtained as described above. More specifically, a higher harmonic determining means 33 in the microcomputer 30 determines an order n (=fc/fs) of the higher harmonic component near the AM radio receiving frequency fc; such a higher harmonic component is generated in the switching operation of the switching element 14 and possibly causes radio receiving disturbance. A frequency judging means 34 judges whether the power supply higher harmonic component of the order n is higher or lower than the AM radio receiving frequency fc.

According to this judgment result, a power supply frequency width determining means 36 determines the upper limit value fs-max and the lower limit value fs-min for the power supply frequency fs that does not interfere with the AM radio receiving frequency fc. This determination is carried out by operational processing according to conditional formulas shown later based on the values of: fundamental power supply frequency fso in the switching operation, the order n of the power supply higher harmonic component, the AM radio receiving frequency fc, and the band width BW of the radio receiving frequency fc.

Figure 2:
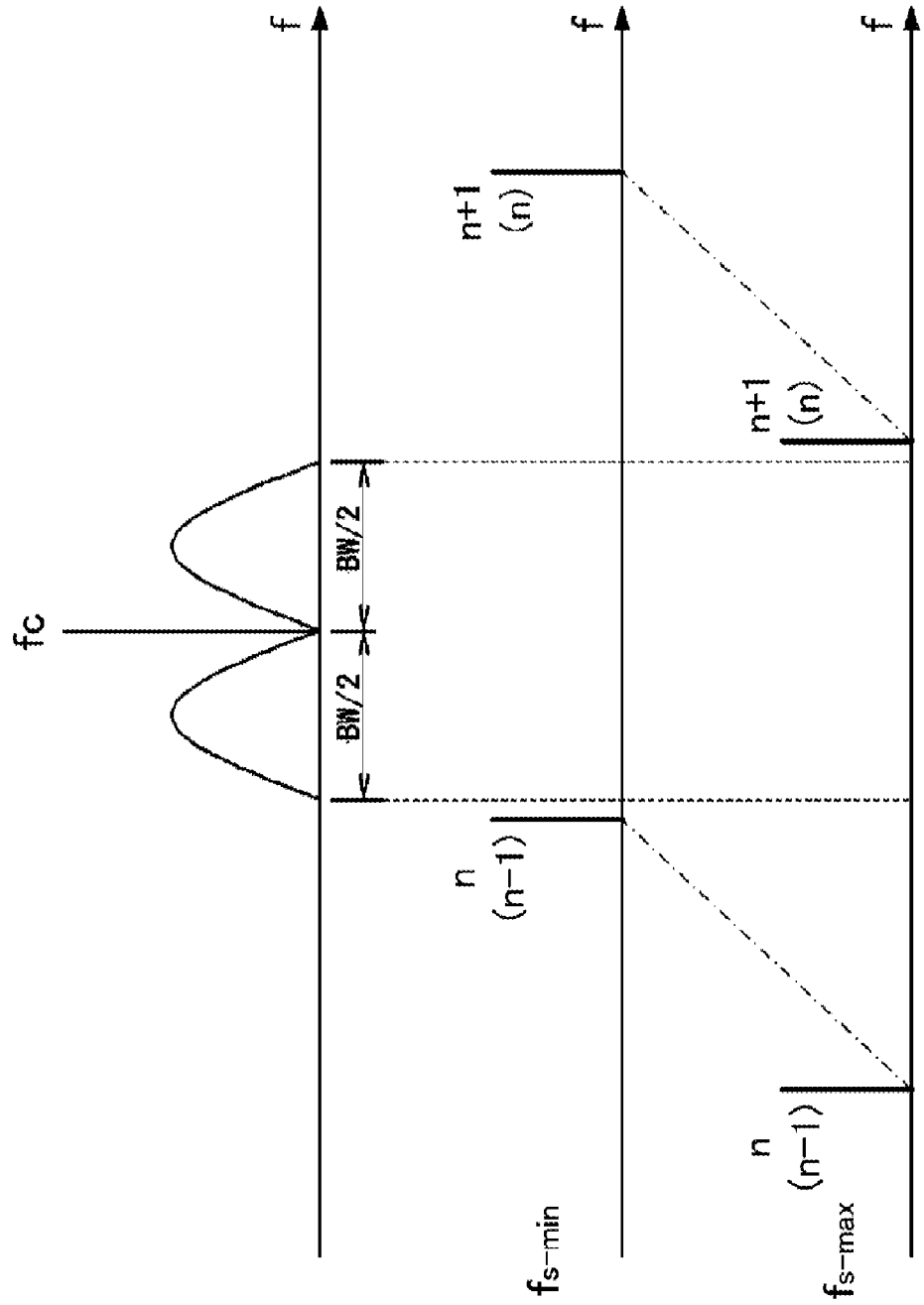
FIG. 2 shows a basic concept of power supply frequency control in the switching power supply shown in FIG. 1.

The power supply frequency width determining means 36 executes different operational processes corresponding to whether the power supply higher harmonic component of the order n is higher or lower than the AM radio receiving frequency fc. In the case the power supply higher harmonic component of the order n is lower than the AM radio receiving frequency fc, as shown by the conceptual diagram in FIG. 2, the upper limit value fs-max for the power supply frequency fs is determined so that the higher harmonic component of the order n is lower than the lower side band zone of the AM radio receiving frequency fc, i.e. lower than fc−BW/2. The lower limit value fs-min for the power supply frequency fs is determined so that the higher harmonic component of the order n+1 is higher than the higher side band zone of the AM radio receiving frequency fc, i.e. higher than fc+BW/2. These conditions for determining the upper limit value fs-max and the lower limit value fs-min are represented by the formulas (1a) and (1b), respectively.

$$fso \times n < fc - BW/2 \tag{1a}$$

$$fso \times (n+1) > fc + BW/2 \tag{1b}$$

The combination of the formulas (1a) and (1b) is referred to as a condition 35a. The lower limit value fs-min and the upper limit value fs-max for the power supply frequency fs are determined so as to satisfy the condition 35a in the case of the power supply higher harmonic component of the order n is lower than the AM radio receiving frequency fc.

In the case the power supply higher harmonic component of the order n is higher than the AM radio frequency receiving frequency fc, the upper limit value fs-max for the power supply frequency fs is determined so that the higher harmonic component of the order n−1 is lower than the lower side band zone of the AM radio receiving frequency fc, i.e. lower than fc−BW/2. The lower limit value fs-min for the power supply frequency fs is determined so that the higher harmonic component of the order n is higher than the higher side band zone of the AM radio frequency fc, i.e. higher than fc+BW/2.

These conditions for determining the upper limit value fs-max and the lower limit value fs-min are represented by the formulas (2a) and (2b), respectively.

$$fso \times (n-1) < fc - BW/2 \quad (2a)$$

$$fso \times n > fc + BW/2 \quad (2b)$$

The combination of the formulas (2a) and (2b) is referred to as a condition 35b. The lower limit value fs-min and the upper limit value fs-max for the power supply frequency fs are determined so as to satisfy the condition 35b in the case of the power supply higher harmonic component of the order n is higher than the AM radio receiving frequency fc.

The microcomputer 30 is provided with an informing means 37 that supplies control information to the power supply frequency control section 15b in the power supply IC 15. The control information includes the upper limit value fs-max and the lower limit value fs-min for the power supply frequency fs as determined above, and is useful for avoiding receiving disturbance to the AM radio broadcast. The determining and informing (e.g., supplying of control information) processes for the upper limit value fs-max and the lower limit value fs-min for the power supply frequency fs are conducted every time the receiving frequency fc of the AM radio broadcast changes.

In the case a plurality of receiving frequencies fc of AM radio broadcast are preliminarily set, the microcomputer determines the upper limit value fs-max and the lower limit value fs-min for the power supply frequency fs corresponding to each of the pre-set receiving frequencies fc and delivers the pieces of information all together to the power supply frequency control section 15b. The power supply frequency control section 15b in this case determines the upper limit value fs-max and the lower limit value fs-min for the power supply frequency fs determined and informed corresponding to the receiving frequency fc that is tuned to receive the broadcast.

In the power supply frequency control section 15b, a checking means 38 self-checks whether the actual power supply frequency fs detected by the power supply frequency detecting means 15a is within the permitted range for variation in power supply operating frequency prescribed in the specification of the main body 10 of the switching power supply. After certifying the power supply frequency normal, the power supply frequency control section 15b compares the power supply frequency fs with the upper limit value fs-max and with the lower limit value fs-min, which are determined as described above, to judge whether or not the power supply frequency fs is within the range specified by the upper limit value fs-max and the lower limit value fs-min.

When an oscillator of a voltage controlled type is used for generating a pulse signal to specify the power supply frequency fs as described previously, the checking of the power supply frequency fs may be carried out using voltage information that is converted from the power supply frequency fs detected by the power supply frequency detecting means 15a, using a frequency-voltage converting circuit (not shown in any of the figures). More specifically, a voltage representing the detected power supply frequency fs is compared with threshold voltages representing the upper limit value fs-max and the lower limit value fs-min for the power supply frequency fs.

When the power supply frequency fs falls into the range specified by the upper limit value fs-max and the lower limit value fs-min, the power supply frequency fs is maintained in the consideration that the higher harmonics of the power supply frequency fs do not interfere with the receiving frequency fc of the AM radio broadcast. If the power supply frequency fs is outside the range specified by the upper limit value fs-max and the lower limit value fs-min, the power supply frequency fs is changed so as to be included within the range. The above-described processes—comparison and correction—are conducted in a power supply frequency control means 39 in the power supply frequency control section 15b. The setting of correction of the power supply frequency fs is conducted within the permitted range for variation in power supply operating frequency prescribed in the specification of the main body 10 of the switching power supply.

Thus, the main body 10 of the switching power supply ON/OFF-drives the switching element 14 therein with a driving means 40 of the power supply IC 15 at a power supply frequency fs determined in the range specified by the upper limit value fs-max and the lower limit value fs-min and at the same time within the permitted range for variation in power supply operating frequency prescribed in the specification. Consequently, any higher harmonic component of the power supply frequency fs does not interfere with the frequency band of the AM radio broadcast, and receiving disturbance to the AM radio broadcast is effectively avoided. In addition, the power supply frequency fs self-checks to stably operate the main body 10 of the switching power supply, which effectively suppresses generation of undesired conduction noise through the power supply line.

Moreover, the actual power supply frequency fs for ON/OFF-driving the switching element 14 is detected with the current running through the switching element 14 using a shunt resistor 18. This detection method takes advantage of a function basically provided by the power supply IC 15 that protects the switching element 14 against overcurrent and thus readily carried out. If the self-check indicates abnormality in the power supply frequency fs, the main body 10 of the switching power supply stops operation and reports the abnormality. Thus, any trouble caused by the abnormality in the switching power supply 1 is avoided in advance, which is a secondary advantage of the invention.

Now a specific explanation will be presented in the following about the upper limit value fs-max and the lower limit value fs-min for the power supply frequency fs that does not cause interference with the radio receiving frequency fc. In a case of the receiving frequency fc of an AM radio broadcast of 540 kHz, for example, receiving disturbance to the AM radio broadcast would possibly occur at a higher harmonic power supply noise of a fundamental power supply frequency fso of 100 kHz at an order n of the higher harmonic. The order n=fc/fso=540 kHz/100 kHz=5.4, the nearest natural number of which is 5. The frequency of the higher harmonic power supply noise in this case, i.e. a higher harmonic component of the order n, is 500 kHz of the order 5, which is lower than the receiving frequency fc of the AM radio broadcast. Thus, applying the formula (1a) with numerical values fc=540 kHz, n=5, and BW=15 kHz (this value is constantly used), the upper limit value fs-max for the power supply frequency fs turns out to be: fs×5<540 kHz−15 kHz/2→fs<106.5 kHz→fs-max=106 kHz, which is a conservative round number.

The lower limit value fs-min for the power supply frequency fs is obtained applying the formula (1b) with numerical values fc=540 kHz, n=5, and BW=15 kHz (this value is constantly used), fs×(5+1)>540 kHz+15 kHz/2→fs>91.25 kHz→fs-min=92 kHz, which is a conservative round number. Therefore, the power supply frequency fs is determined to be within the range from 92 kHz to 106 kHz. Higher harmonic components of a power supply frequency fs within this range do not interfere with the radio receiving frequency fc (=540 kHz) of the AM radio broadcast as shown by the conceptual diagram of FIG. 2, and receiving disturbance is avoided.

Similarly, in the case of a receiving frequency fc of an AM radio broadcast of 864 kHz, receiving disturbance to the AM radio broadcast would possibly occur at a higher harmonic power supply noise at an order n that is: n=fc/fso=864 kHz/100 kHz=8.64, the nearest natural number of which is 9. The frequency of the higher harmonic power supply noise in this case is 900 kHz of the order n (=9) and higher than the receiving frequency fc (=864 kHz) of the AM radio broadcast. Thus, applying the formula (2a) with numerical values fc=864 kHz, n=9, and BW=15 kHz (this value is constantly used), fs×(9−1)<864 kHz−15 kHz/2→fs<107.1 kHz→fs-max=107 kHz, which is a conservative round number.

The lower limit value fs-min for the power supply frequency fs is obtained applying the formula (2b) with numerical values fc=864 kHz, n=9, and BW=15 kHz (this value is constantly used), fs×9>864 kHz+15 kHz/2→fs>96.8 kHz→fs-min=97 kHz, which is a conservative round number. Therefore, the power supply frequency fs is determined to be within the range from 97 kHz to 107 kHz. Higher harmonic components of a power supply frequency fs within this range do not interfere with the radio receiving frequency fc (=864 kHz) of the AM radio broadcast as shown by the conceptual diagram of FIG. 2, and receiving disturbance is avoided.

In still another case of the receiving frequency fc of an AM radio broadcast of 1,512 kHz, receiving disturbance to the AM radio broadcast would possibly occur at a higher harmonic power supply noise at an order n that is: n=fc/fso=1,512 kHz/100 kHz=15.12, the nearest natural number of which is 15. The frequency of the higher harmonic power supply noise in this case is 1,500 kHz of the order n (=15) and is lower than the receiving frequency fc (=1,512 kHz) of the AM radio broadcast. Thus, applying the formula (1a) with numerical values fc=1,512 kHz, n=15, and BW=15 kHz (a constant value), the upper limit value fs-max for the power supply frequency fs is: fs×15<1,512 kHz−15 kHz/2→fs<100.3 kHz→fs-max=100 kHz, which is a conservative round number.

The lower limit value fs-min for the power supply frequency fs is obtained applying the formula (1b) with numerical values fc=1,512 kHz, n=15, and BW=15 kHz (this value is constantly used), fs×(15+1)>1,512 kHz+15 kHz/2→fs>94.9 kHz→fs-min=95 kHz, which is a conservative round number. Therefore, the power supply frequency fs is determined to be within the range from 95 kHz to 100 kHz. Higher harmonic components of a power supply frequency fs within this range do not interfere with the radio receiving frequency fc (=1,512 kHz) of the AM radio broadcast as shown by the conceptual diagram of FIG. 2, and receiving disturbance is avoided.

When a permissible range of variation of the fundamental power supply frequency fso is ±10%, variation of a power supply frequency fs in the range from 90 kHz to 110 kHz is permitted for this switching power supply with a fundamental power supply frequency of 100 kHz. Consequently, even through the power supply frequency fs is changed within this range in order to avoid receiving disturbance, the main body 10 of the switching power supply does not operate abnormally.

A switching power supply 1 according to an embodiment of the invention determines the upper limit value fs-max and the lower limit value fs-min for a power supply frequency fs corresponding to the receiving frequency fc of an AM radio broadcast and sets a power supply frequency fs within this frequency range. Therefore, interference between the higher harmonic component of the power supply frequency fs and the receiving frequency fc of the AM radio broadcast is avoided surely and effectively. Whereas the frequency of AM radio broadcast that can be received differs from region to another, a switching power supply 1 mounted on a moving vehicle detects the receiving frequency fc of the AM radio broadcast to be received in that region, and the switching power supply 1 controls the power supply frequency fs in the way as described above using the actually detected power supply frequency fs, adaptively avoiding interference with the receiving frequency fc of the AM radio broadcast.

Thus, higher harmonic power supply noise is reduced without receiving disturbance of AM radio broadcast. The switching power supply of the invention has secondary advantages; to relax requirement for a filter provided in the power supply, and to simplify a shield structure against electromagnetic interference. Receiving disturbance to AM radio broadcast can be avoided by improving only the function of the power supply IC 15, which is a simple and inexpensive way.

The present invention is not limited to the embodiment described thus far. Although the above description has been made for the case of the fundamental frequency fso of 100 kHz, the present invention can of course be applied to DC-DC converters performing switching operation at other fundamental power supply frequencies fso. It should be acknowledged that the present invention can be applied with various modifications without departing from the spirit and scope of the invention.

DESCRIPTION OF SYMBOLS

1: switching power supply
10: main body of the switching power supply, which is a DC/DC converter
11: isolation transformer
12: inductor
13: input capacitor
14: semiconductor switching element
15: power supply IC
15a: power supply frequency detecting section
15b: power supply frequency control section
16: rectifying diode
17: output capacitor
18: shunt resistor
20: AM radio receiver, an electronic device
30: microcomputer

What is claimed is:
1. A switching power supply comprising:
a main body of the switching power supply that performs switching operation of a DC power using a semiconductor switching element ON/OFF-driven at a power supply frequency fs and rectifying and smoothing operation of the switched power to supply a DC voltage to electronic devices including an AM radio receiver;
a receiving frequency detecting means that detects a receiving frequency fc of an AM radio broadcast;
a power supply frequency detecting means that detects power supply frequency fs of ON/OFF-driving the semiconductor switching element;
a higher harmonic detecting means that determines an order n, n a natural number, of a higher harmonic component near the receiving frequency fc of the AM radio broadcast, the higher harmonic being a power supply higher harmonic generated with switching operation of the semiconductor switching element, based on a fundamental power supply frequency fso of ON/OFF-driving the semiconductor switching element;
a frequency judging means that judges whether the higher harmonic component of the order n that is determined by the higher harmonic detecting means is higher or lower than the receiving frequency fc of the AM radio broadcast and output a frequency judgment result;

a power supply frequency width determining means that determines, according to the frequency judgment result, an upper limit value fs-max and a lower limit value fs-min for a power supply frequency fs that does not interfere with the receiving frequency fc of the AM radio broadcast from values of the fundamental power supply frequency fso of the switching operation, the order n of the higher harmonic component, the receiving frequency fc of the AM radio broadcast, and a bandwidth BW thereof; and a power supply frequency control means that compares the power supply frequency fs with the upper limit value fs-max and with the lower limit value fs-min for the power supply frequency fs and sets the power supply frequency fs at a value within a range specified by the upper limit value fs-max and the lower limit value fs-min.

2. The switching power supply according to claim 1, wherein the power supply frequency width determining means determines the upper limit value fs-max and the lower limit value fs-min for a power supply frequency fs so that relations fso×n>fc+BW/2 and fso×(n−1)<fc−BW/2 are satisfied when the higher harmonic component (fso×n) of the order n is higher than the receiving frequency fc of the AM radio broadcast, and so that relations fso×(n+1)>fc+BW/2 and fso×n<fc−BW/2 are satisfied when the higher harmonic component (fso×n) of the order n is lower than the receiving frequency fc of the AM radio broadcast.

3. The switching power supply according to claim 1, wherein the power supply frequency detecting means detects the power supply frequency fs of ON/OFF-driving the semiconductor switching element from electric current flowing through the semiconductor switching element.

4. The switching power supply according to claim 1, wherein the power supply frequency control means maintains the power supply frequency fs when the power supply frequency fs is in a range specified by the upper limit value fs-max and the lower limit value fs-min, and corrects the power supply frequency fs so as to be contained in the range specified by the upper limit value fs-max and the lower limit value fs-min when the power supply frequency fs is outside the range.

5. The switching power supply according to claim 1, wherein the power supply frequency control means determines the power supply frequency fs within the range specified by the upper limit value fs-max and the lower limit value fs-min and in a frequency range determined based on a specification of the switching power supply.

6. An apparatus, comprising:

a control device configured to perform a switching operation that controls a power supply frequency fs to be within a frequency range determined based at least partly on a bandwidth of a received AM radio broadcast having a receiving frequency fc; and a logic device configured to determine the frequency range by operations including determining an upper limit value fs-max and a lower limit value fs-min for the power supply frequency fs that does not interfere with the receiving frequency fc of the AM radio broadcast from values of a fundamental power supply frequency fso of the switching operation, an order n of a harmonic frequency component, the receiving frequency fc of the AM radio broadcast, and the bandwidth of the received AM radio broadcast, comparing the power supply frequency fs with the upper limit value fs-max and with the lower limit value fs-min for the power supply frequency fs, and setting the power supply frequency fs at a value within a range specified by the upper limit value fs-max and the lower limit value fs-min.

7. A switching power supply comprising:

a main body of the switching power supply configured to perform switching operation of a DC power using a semiconductor switching element ON/OFF-driven at a power supply frequency fs and rectifying and smoothing operation of the switched power to supply a DC voltage to electronic devices including an AM radio receiver;

a power supply frequency detecting circuit configured to detect a power supply frequency fs of ON/OFF-driving the semiconductor switching element; and a processor including circuits configured to detect a receiving frequency fc of an AM radio broadcast;

determine an order n, n a natural number, of a higher harmonic component near the receiving frequency fc of the AM radio broadcast, the higher harmonic being a power supply higher harmonic generated with switching operation of the semiconductor switching element, based on a fundamental power supply frequency fso of ON/OFF-driving the semiconductor switching element, judge whether the higher harmonic component of the order n that is determined by the higher harmonic detecting means is higher or lower than the receiving frequency fc of the AM radio broadcast and output a frequency judgment result;

determine, according to the frequency judgment result, an upper limit value fs-max and a lower limit value fs-min for a power supply frequency fs that does not interfere with the receiving frequency fc of the AM radio broadcast from values of the fundamental power supply frequency fso of the switching operation, the order n of the higher harmonic component, the receiving frequency fc of the AM radio broadcast, and a bandwidth BW thereof; and compare the power supply frequency fs with the upper limit value fs-max and with the lower limit value fs-min for the power supply frequency fs and set the power supply frequency fs at a value within a range specified by the upper limit value fs-max and the lower limit value fs-min.

* * * * *